United States Patent
Kim et al.

(10) Patent No.: US 7,008,576 B2
(45) Date of Patent: Mar. 7, 2006

(54) MICROPOROUS CERAMIC MATERIALS AND THE PRODUCING METHOD OF THE SAME

(75) Inventors: Hai-Doo Kim, Changwon-shi (KR); Young-Wook Kim, Seoul (KR); Chul Bum Park, Ontario (CA)

(73) Assignee: Korea Institute of Machinery and Materials, Daejon (KR)

( * ) Notice: Subject to any disclaimer, the term of this patent is extended or adjusted under 35 U.S.C. 154(b) by 0 days.

(21) Appl. No.: 10/462,810

(22) Filed: Jun. 17, 2003

(65) Prior Publication Data

US 2004/0048731 A1  Mar. 11, 2004

(30) Foreign Application Priority Data

Jun. 29, 2002 (KR) .................. 10-2002-0037403

(51) Int. Cl.
- *B28B 1/00* (2006.01)
- *C04B 33/32* (2006.01)

(52) U.S. Cl. .............. 264/42; 264/624; 264/628; 264/50; 501/80

(58) Field of Classification Search .......... 264/41, 264/42, 43, 44, 45, 51, 55, 624, 625, 626; 501/80, 81

See application file for complete search history.

(56) References Cited

U.S. PATENT DOCUMENTS

| | | | | |
|---|---|---|---|---|
| 4,136,250 A | * | 1/1979 | Mueller et al. | ............... 528/29 |
| 4,248,814 A | * | 2/1981 | Yajima et al. | .............. 264/624 |
| 5,283,019 A | * | 2/1994 | Atwell et al. | ................. 264/44 |
| 5,563,212 A | * | 10/1996 | Dismukes et al. | .......... 524/786 |
| 5,759,460 A | * | 6/1998 | Niihara et al. | .............. 264/628 |
| 5,872,070 A | * | 2/1999 | Dismukes et al. | ............ 501/80 |
| 2002/0043734 A1 | * | 4/2002 | Ohji et al. | .................... 264/43 |

OTHER PUBLICATIONS

Hearle, High Performance Fibers, Copyright 2001, Woodhead Publishing, p. 240, 244-245.*

* cited by examiner

*Primary Examiner*—Dionne A. Walls
*Assistant Examiner*—Lisa L. Herring
(74) *Attorney, Agent, or Firm*—Lowe, Hauptman & Berner, LLP

(57) ABSTRACT

Microporous ceramic materials used in structural materials, high-temperature filters, electrode materials or preform materials for infiltration by homogeneously mixing and molding a ceramic precursor powder polymer. The powder is saturated by introducing fluid to a pressure vessel. The fluid is super saturated by adjusting pressure in the vessel. Micropores are formed in the molded bodies by evolving the fluid from the molded bodies by heating and hardening the molded bodies. The hardened molded bodies are heated to pyrolysis. Pore characteristics (e.g., pore size and pore size distribution) suitable to target materials are controlled by adjusting pressure at a non-critical state without requiring additional processes or devices.

12 Claims, 2 Drawing Sheets

(a)          (b)

MICROPOROUS CERAMIC MATERIALS AND THE PRODUCING METHOD OF THE SAME

TECHNICAL FIELD

The present invention relates to microporous ceramic materials, which can be used as basic materials in various industries, or more particularly to microporous ceramic materials and the production method thereof, wherein their pore size and the distribution of pores are uniform with easy control of their pore size, which can be used suitably in various structural materials, high-temperature filters, electrode materials, preform materials for infiltration, etc.

BACKGROUND ART

Multiporous ceramics are materials widely used as basic materials in various industries, e.g., filters, catalyst carriers, sensors, refractory materials, lightweight structural materials, and preform materials for infiltration. However, when pore size distribution in this type of multiporous ceramics is wide, or the distribution of pores is uneven, the stress applied to the material is not distributed across the entire material but is concentrated to the weakest portion where there is a cluster of pores, which in the end lowers its strength and leads to non-homogeneous strength distribution. Accordingly, with respect to multiporous ceramic materials, the control of pore size and the distribution of pores are important factors for quality enhancement.

In general, the production methods of multiporous ceramic materials can be classified mainly into two methods. The first method involves a process of producing multiporous ceramic materials by adding and then mixing pyrolytic or volatile materials to ceramics, and then forming pores by volatilizing the volatile component in said mixture. This type of methods is exemplified by U.S. Pat. No. 5,358,910. To summarize, the method in U.S. Pat. No. 5,358,910 comprises mixing ceramics and polymers by for example first ball-milling them, making said mixture into molded bodies of a certain shape, and heating said molded bodies so as to carry out pyrolytic reaction by combusting the combustible materials and volatilizing the volatile materials in the polymer component of the molded bodies. Meanwhile, the ceramic component in the molded bodies is sintered by heating, and the volatile materials in said polymer component are volatilized. In the end, in their places, the pores are formed, thereby resulting in production of multiporous ceramic materials.

However, this type of methods involves a necessary process of mixing ceramics to pyrolytic or volatile materials, and in this process of mixing, it is impossible to mix the raw materials with 100% homogeneity. Accordingly, there are disadvantages in that the sizes of the pores formed as such (i.e., in places of volatile materials after volatilization) and the distribution of such pores are not uniform. Moreover, it is rather difficult to control the pore size with the desirable characteristics of the material because of the wide size distribution of the pyrolytic or volatile materials.

As for the second method, it involves producing multiporous ceramic materials by partial sintering of ceramics.

The second method may further be sub-classified into two sub-methods. The first one involves forming more pores by adjusting the sintering conditions of ceramics for example by lowering relative density of ceramics by sintering ceramics at a temperature appropriately lower than the optimal sintering temperature. However, the multiporous ceramics produced by this method are not sintered under the optimal sintering conditions, and as such, the mechanical properties, such as strength, are significantly deteriorated.

Moreover, there is a method of producing multiporous ceramics, such as in the invention as disclosed in U.S. Pat. No. 6,214,078, which involves lowering sinterability by using the differences in particle sizes of ceramic raw materials. The method involves manufacturing molded bodies of a certain shape by mixing ceramic raw materials of small and large particle sizes, respectively, and sintering them by heating. As such, the large particles, which have relatively small surface energy acting as driving force for sintering process as compared to that of the smaller particles, end up hindering the sintering process therein. As a result, the method produces multiporous ceramics by lowering relative density of ceramics to form pores therein. However, this method too includes a mixing process of raw materials and has the same problems of non-uniformity of pore size and distribution, in addition to the ensuing difficulties in controlling pore size, which are all due to non-homogeneous mixing.

Meanwhile, although not an invention relating to ceramics, U.S. Pat. No. 5,158,986 discloses a method of producing microporous plastic materials. The method involves saturating plastic materials using supercritical $CO_2$ and forming a large number of bubbles via a rapid pressure drop. In other words, the method produces microporous plastic materials of relatively even distribution of pores across the entire materials by using supercritical $CO_2$ as a medium for forming pores.

However, as for the method disclosed in U.S. Pat. No. 5,158,986, it has a disadvantage of high cost since the method requires additional equipment, such as a heating device for making supercritical $CO_2$ as a medium for forming pores. Moreover, it also has the problem of complicating operation process since the method requires additional preliminary processes, i.e., such as for making supercritical $CO_2$, the processes of reducing specific volume by cooling saturated $CO_2$, and re-pressurizing or heating.

SUMMARY OF THE INVENTION

The present invention was devised in order to resolve the above problems. The present invention purports to provide microporous ceramic materials having uniform pore size and uniform distribution of pores throughout the entire materials, and the production method thereof by means of (i) saturating molded bodies containing a polymer ceramic precursor using fluid of a non-critical state as a medium for forming pores, (ii) forming a large number of bubbles using thermodynamic instability via a rapid pressure drop or heating, and (iii) hardening and transforming the microporous molded bodies into microporous ceramic materials by pyrolysis.

As a result of research for overcoming the disadvantages of conventional art, the inventors of the present invention learned that they could obtain pores of a relatively uniform size range by saturating by introducing fluid of a non-critical state, adjusted to certain pressure, to a polymer ceramic precursor, undergoing hardening and pyrolysis, thereby uniformly distributing pores over the entire materials.

The polymer ceramic precursor, comprising a ceramic component and a volatile component, is a polymer material converted to ceramics by heat treatment. The inventors of the present invention discovered that they could produce microporous ceramic materials having superior mechanical characteristics by introducing fluid of a non-critical state to said polymer ceramic precursor without using supercritical fluid as a medium for forming pores.

The fluid on the basis of its critical state can be classified into three types of fluid: i.e., those of non-critical, critical, and supercritical states. The critical state is a state in which a phase change cannot be observed due to the identical properties of fluid and gas. The temperature and pressure at that point are called critical temperature and critical pressure, respectively. In other words, the critical temperature is the highest temperature, at which the gas-liquid equibrium can occur, and the pressure at this point is the critical pressure. The supercritical fluid is in a state above the critical state, and at that point, the fluid is neither liquid nor gas, but in a third state, i.e., in a fluid state. As described above, U.S. Pat. No. 5,158,986 discloses a technology of producing multiporous plastic materials by using supercritical fluid.

As such, as the supercritical fluid has the properties of both gas and liquid, it is an excellent solvent having liquid-phase solubility and gas-phase diffusion. U.S. Pat. No. 5,158,986 is a technology, which utilizes such properties of supercritical fluid. However, as stated above, since the technology requires additional devices and processes for making supercritical fluid, it has the critical disadvantage of high cost.

In considering these factors, the inventors of the present invention realized that they could produce microporous materials by adjusting pressure even in the general state of fluid at its non-critical state and also discovered that this type of methods is highly suitable in particular with respect to ceramic materials.

In particular, without using supercritical fluid, by adjusting only pressure at high temperature, the present invention has an advantage in that it affords easy control of the number of pores, porosity, and pore density in microporous ceramic materials. To this point, in case of using supercritical fluid as a medium for forming pores, it is rather difficult to make supercritical fluid by only controlling pressure, and thus the procedure necessarily accompanies high temperature. Accordingly, it would necessarily require accompanying devices and additional processes for controlling both temperature and pressure.

Based on said technical concepts, the method of producing microporous ceramic materials according to the present invention, for achieving said objectives, comprises the following steps of: homogeneously mixing a starting material of polymer ceramic precursor powder with ceramic powder and producing molded bodies by forming the same; introducing fluid of a non-critical state to said molded bodies in a pressure vessel and saturating the same; super-saturating fluid of a non-critical state saturated to said molded bodies by adjusting the pressure in said pressure vessel; forming micro-pores onto said molded bodies by evolving the fluid of a non-critical state from said molded bodies using a thermodynamic instability via a rapid pressure drop or heating said molded bodies; hardening the molded bodies with said micro-pores; and carrying out pyrolysis by heating the hardened molded bodies.

In the steps of mixing said starting material and forming the same, the present invention may use a pure polymer ceramic precursor without ceramic powders.

DETAILED DESCRIPTION OF THE PREFERRED EMBODIMENT

Below is the detailed description of microporous ceramic materials of the present invention and the production method thereof.

Figure 1:
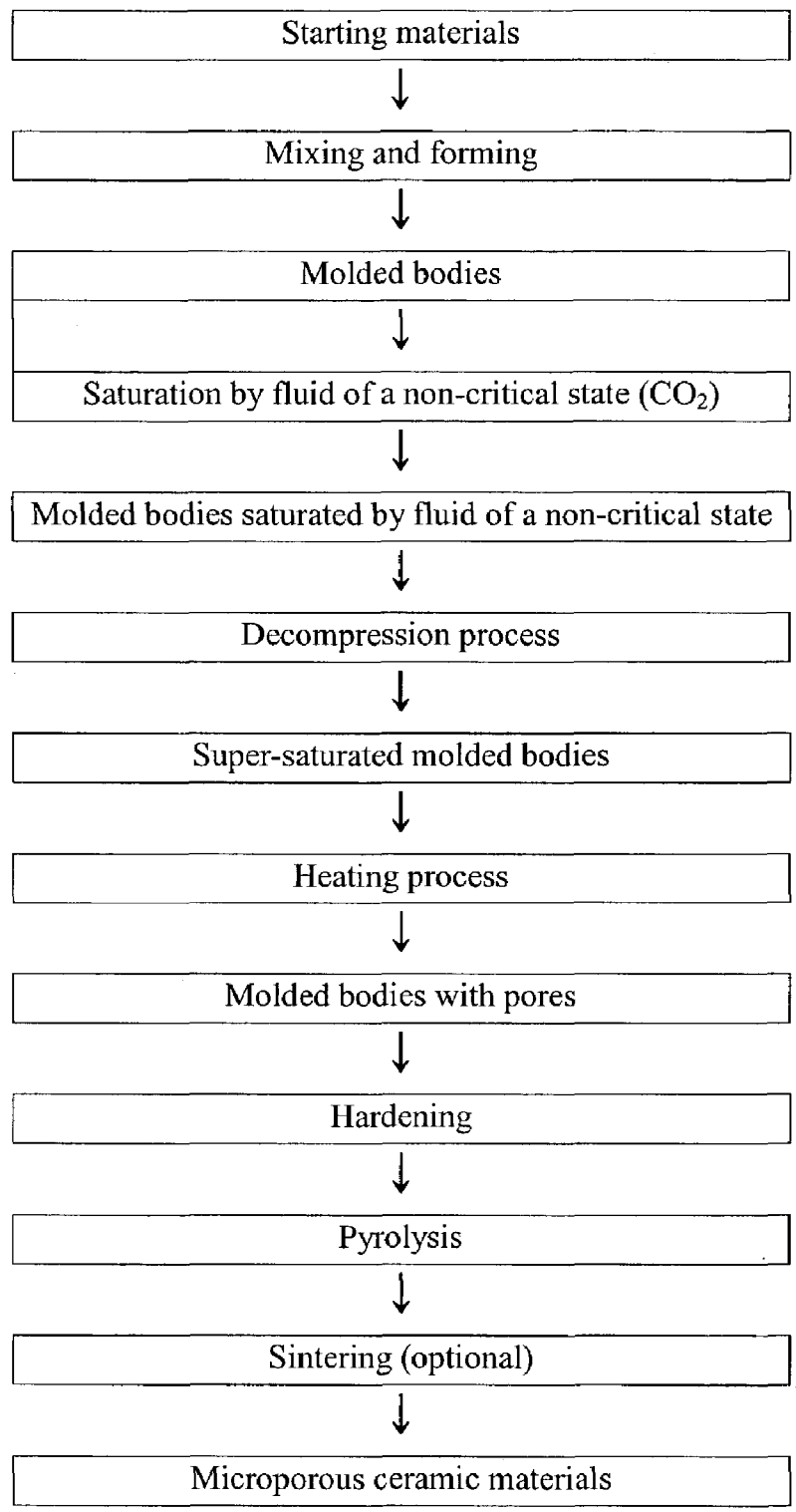
FIG. 1 is a process diagram, which illustrates the production method of microporous ceramic materials according to the present invention.

FIG. 1 is a process flow of the production method of microporous ceramic materials according to the present invention.

As illustrated in FIG. 1, the first process for producing microporous ceramic materials of the present invention is a process for homogeneously mixing the starting material, followed by forming.

The starting material necessarily includes a polymer ceramic precursor, which is a raw material for microporous ceramic materials. As for main polymer ceramic precursors, which are raw materials for microporous ceramics materials, there are polycarbosilane, polysiloxane, polysilazane, etc., all of which include silicon (Si). The polymer ceramic precursor is mixed into the starting material in the form of powder. As for said powder, it is preferable to use fine power having particle size distribution of 1~200 $\mu$m with an average particle diameter of 50 $\mu$m.

Then, the ceramic powder is mixed into the starting material. Of course, as stated above, the process may use only the pure polymer ceramic precursor as a starting material without ceramic powder, and in this case, the direct forming is possible since there is no mixing process of the starting material.

The ceramic powder is added thereto as a sintering additive, or for the purposes of changing the composition of microporous ceramic materials. As for main ceramic powder components added as sintering additives, there are $Al_2O_3$ or $Y_2O_3$, and as for ceramic powder components added thereto for the purposes for changing the composition of microporous ceramic materials, the powder containing Si (e.g., SiC, $SiN_4$) can be added. Depending on the desirable properties of the materials, these types of ceramic powder can all be added therein.

In the starting material, it is preferable to include at least 50 wt % or more of the polymer ceramic precursor in the total weight of the starting material. If the content of the polymer ceramic precursor in the total weight of the starting material is 50 wt % or less, the fluid, infused into the molded bodies by diffusion during the process of introducing fluid of a non-critical state, thereafter diffuses to outside of the molded bodies through the interface of the polymer ceramic precursor with the other components, which in the ends leads to difficulties in saturating molded bodies with fluid of a non-critical state. Accordingly, in such case, during the process of forming pores, the micropores cannot be produced to the degree of the desirable objective. Therefore, it is preferable to include 80 wt % or more of said polymer ceramic precursor in the total weight of the starting material.

Moreover, it is preferable to include 50 wt % or less of ceramic powder to the total weight of the starting material. As stated above, if the components other than the polymer ceramic precursor are added thereto to exceed 50 wt %, the tendency of the fluid, which is introduced into the polymer ceramic precursor, to diffuse to the outside increases, which in the end suppresses formation of pores. However, if the ceramic powder is added as a sintering additive (i.e., $Al_2O_3$ or $Y_2O_3$), it is not preferable to exceed 20 wt % of the total weight of the starting material. If the ceramic powder is added thereto, exceeding 20 wt % of the total weight of the starting material, the number of pores or the density decreases by way of transformation in the pore structures as a result of the remaining ceramic powder in liquid phase, which after melting in the sintering process ends up filling up the pores. Accordingly, depending on the characteristics of the materials, in the case of adding two types of ceramic powder, e.g., $Al_2O_3$ as a sintering additive, and SiC for adjusting the ceramic component, the total weight of the ceramic powder should be 50 wt % or less of the total weight of the starting material, and at that point, the sintering additive component ($Al_2O_3$) cannot exceed 20 wt % of the total weight of the starting material. As such, the SiC component added to adjust the ceramic component cannot exceed 30 wt % of the total weight of the starting material.

Meanwhile, depending on the type of polymer ceramic precursors, the process may need a hardener (cross-linking agent). For example, although it is not necessary to add a hardener in case of polycarbosilane or polysilazane, which is hardened by oxygen in air, it is necessary to add a hardener in case of polysiloxane, which is not sufficiently hardened by oxygen. As for hardeners for polymer ceramic precursors, there are for example aluminumacetyl acetonate and triethylene diamine.

In case of requiring a hardener, it is added to the starting material of a polymer ceramic precursor and ceramic powder, or a starting material of only a polymer ceramic precursor, followed by mixing and forming. As for the weight percentage of the hardener, preferably it should be 5 wt % or less of the total weight of the polymer ceramic precursor. If the hardener is added thereto, exceeding 5 wt % of the total weight of the polymer ceramic precursor, there is a possibility of structural damage to micropores by way of exceedingly rapid hardening of molded bodies during the hardening process.

For producing microporous ceramic materials of the present invention, it is necessary to homogeneously mix the starting material of a polymer ceramic precursor and ceramic powder. In case of adding a hardener to the starting material, they are mixed together and formed thereafter. For facilitating molding, a mixture of raw materials is produced by adding an organic binder (e.g., polyethylene glycol, polyvinylalcohol) and solvent to the starting material, and the mixture is mixed homogeneously to the sufficient degree by means of a general mixing process, for example by ball-milling. Since the polymer ceramic precursors, organic binders, and hardeners are soluble to the solvent (e.g., ethanol, hexane), a homogeneous mixture is obtained. In case of using pure powder of a polymer ceramic precursor as a starting material, the mixing process may be omitted, but in case of adding a hardener, the mixing process is then necessary.

The mixture of raw materials homogeneously mixed in the mixing process is formed into molded bodies of a certain shape by means of a commonly used forming process. In other words, it may be formed by means of a commonly used uniaxial pressing and/or a hydrostatic molding. However, if necessary, other than these types of molding methods, forming methods, such as extrusion or injection molding, can also be used.

The second process for producing microporous ceramic materials according to the present invention comprises placing the molded bodies of a certain shape formed during the above mixing and forming processes into a pressure vessel, and then saturating the same by introducing thereto fluid of a non-critical state.

In the present invention, as for fluid, which can be used as a medium for forming pores, $CO_2$ is appropriate, which is not toxic and inexpensive with superior penetration capability. The critical temperature and pressure of $CO_2$ are 31° C. and 75 atm, and at temperature of 31° C. or below, it is impossible to produce supercritical $CO_2$, no matter how high the pressure is. Moreover, at 25° C., $CO_2$ exists as a gaseous state at pressure of less than 85 atm, and as liquid at pressure of 85 atm or higher.

The present invention uses $CO_2$ of a non-critical state, which is in a state below its critical temperature and pressure. Further, depending on the characteristics of the target material, the pressure and temperature conditions for $CO_2$ are selected within the range below its critical state.

The preferable pressure range of $CO_2$ as a medium for forming pores is 20~400 atm at temperature below its critical temperature (i.e., 31° C.). This is so because in case of $CO_2$ at pressure (gaseous state) below 20 atm, it becomes difficult to saturate the molded bodies by $CO_2$ gas due to the slow diffusion rate of $CO_2$ molecules into the polymer ceramic precursor. Moreover, at 400 atm or higher, whereas it adds burden in terms of cost and equipment, such as necessitating a super high-pressure vessel, it shows little effect of enhancement with respect to pore characteristics, such as porosity, pore size and pore size distribution. Depending on the circumstances, microporous ceramic materials could be made at temperature below 0° C., but it is not preferable due to the slow diffusion rate of fluid.

The third process involves super-saturating the fluid of a non-critical state with respect to the polymer ceramic precursor by a thermodynamic instability via a rapid pressure drop If the pressure in said pressure vessel is higher than 20 atm, preferably decompressing to atmospheric pressure, the $CO_2$ gas within the molded bodies become super-saturated. At that point, depending on the characteristics of the target material, a modification of temperature is possible within the temperature range below its critical temperature. As an example, at temperature of 20° C. or 25° C., $CO_2$ can conveniently be super-saturated by only changing pressure. In other words, the present invention has an advantage in that it allows production of microporous ceramic materials with uniform pore size and pore size distribution, which are consistent with the characteristics of the target material, at room temperature, which is a common condition, by means of adjusting only the $CO_2$ pressure, which is a medium for forming pores therein.

The fourth process is a step of forming micropores in molded bodies by rapidly evolving $CO_2$ from the molded bodies by heating said molded bodies. In the case of super-saturation of fluid of a non-critical state by only reducing pressure at room temperature, it is very difficult to evolve fluid from inside the molded bodies since in that case the diffusion rate is slow, and the evolution of fluid to a limited degree occurs only on the surface of the molded bodies. Moreover, if the molded bodies are in the hardened state at room temperature (i.e., lower than the softening temperature), it is necessary to heat the molded bodies at a certain temperature since the pores do not form therein for all practical purposes.

It is preferable to heat the molded bodies at a temperature range between the softening temperature and the melting temperature of the polymer ceramic precursor. For forming micropores, it is necessary to soften the polymer ceramic precursor component in the molded bodies, thereby increasing the diffusion rate, and it is also preferable to heat the same at a temperature above the softening temperature for the purposes of evolving fluid of a non-critical state over the entire regions of the molded bodies (inside and out). Meanwhile, when the polymer ceramic precursor melts, the pore structure formed is damaged. Since the polymer ceramic precursor after melting may fill the pores therein, it is necessary to heat the molded bodies at a temperature below the melting temperature of the polymer ceramic precursor.

In the above process for forming micropores, for uniformly heating the molded bodies, it is preferable to heat indirectly the entire molded bodies by placing the molded bodies in a high-temperature bath filled with glycerin or high-temperature oil.

Moreover, by adjusting the heating time, the pore size can be controlled. For example, in case of using polycarbosilane, it is preferable to heat the molded bodies for 1~300 seconds at a temperature range of 180~260° C.

The fifth process involves hardening the molded bodies with pores. The reason for hardening the molded bodies is to prevent damage to the pore structures formed in the polymer ceramic precursor, which is caused by the melting of the polymer ceramic precursor during heat treatment or pyrolysis. In other words, upon hardening of the polymer ceramic precursor, the polymer ceramic precursor does not melt even if heated at a temperature above the melting temperature of the polymer ceramic precursor during the heat treatment process. However, if not hardened, the pore structures are damaged by melting of the polymer ceramic precursor during the heat treatment process, and the mechanical characteristics, such as desirable target pore characteristics and strength, cannot be obtained due to the filling of the pores.

The hardening process involves heating the molded bodies in air or inert gas at a temperature below a certain temperature for a certain period of time, and the heating temperature and the time may vary depending on the types of polymer ceramic precursors.

In case of using polycarbosilane as a polymer ceramic precursor, it is preferable to heat the same in air at a temperature range of 160~220° C. for 1–12 hours. In case of using polysilazane, it is preferable to heat the same in inert gas such as Ar at a temperature range of 250~350° C. for 1~24 hours. Meanwhile, in case of using polysiloxane as a polymer ceramic precursor, as stated above, it is necessary to add a hardener selected from aluminumacetyl acetonate or triethylene diamine and preferable to heat the same in air at a temperature range of 50~110° C., which is lower than the softening temperature, for 1~100 hours.

The sixth process is a process of pyrolysis by heating said hardened molded bodies in air or inert gas. In the pyrolysis process, the hardener component in the molded bodies, and the volatile component in the polymer ceramic precursor (e.g., a portion of C and H) are volatilized, and only the ceramic component (e.g., Si, C, N) remains. In the pyrolysis process, the ceramic component, which forms the backbone of the microporous ceramic materials, is sintered to some degree, but it is a common practice to add a sintering process after the pyrolysis process. Of course, by increasing the heat treatment time and temperature during pyrolysis, the sintering process can be carried out simultaneously.

In the pyrolysis process, depending on target composition, the heat treatment can be carried out in air or inert gas at a temperature range of 1,600~1,900° C. for 1~12 hours. If the heat treatment is carried out at a temperature below 1,600° C., sintering is not completed in an adequate manner, and if the heat treatment is carried out at a temperature of 1,900° C. or higher, the sinterability decreases on account of evaporation of sintering additives, thereby decreasing the overall strength of the ceramic materials in the end.

During the pyrolysis process, it is preferable to set the rate at which the temperature rises at 5° C./min or lower until 1,000° C. If the rate is higher than 5° C./min, the polymer ceramic precursor undergoes rapid pyrolysis, thereby increasing the possibility of occurrences of cracks in the molded bodies.

Below, the present invention is described in a specific manner by means of embodiments.

Embodiment 1

The polycarbosilane powder (polymer ceramic precursor) used herein had the following characteristics: a particle size distribution of 1~60 $\mu$m, an average particle diameter of approximately 20 $\mu$m, and an average molecular weight of 1,390. The polysilazane used herein had the following characteristics: particle distribution in the range of 1~70 $\mu$m, average particle diameter of approximately 28 $\mu$m, and average molecular weight of 1,650. The starting material was prepared by adding 80% or more of polycarbosilane or polysilazane powder, and sintering additives (ceramic powder) in the range of 2~20 wt % to said polymer ceramic precursor powder, which were selected from 1~12 wt % of $Al_2O_3$ and 1–14 wt % of $Y_2O_3$. After adding the equivalent wt % of ethanol solvent to said starting material, the mixture of said raw materials was placed into a polyethylene ball mill, followed by ball-milling the same for 12 hours by using SiC balls.

The slurry mixture of raw materials after ball-milling was dried in a well-ventilated area. Then, plate-shaped specimens with a dimension of 30×30×5 mm were uniaxially pressed at a pressure of approximately 300 kg/cm$^2$ by using a metal mold. Thereafter, it was placed into a cylindrical latex (rubber mold), sealing the inside of the latex so as to maintain vacuum of 1×10$^{-1}$ mmHg. The molded bodies containing the polymer ceramic precursor were then produced by undergoing hydrostatic molding by pressure of approximately 2,000 kg/cm$^2$.

Microporous ceramics were produced by carrying out saturation, pore formation and hardening and pyrolysis processes with respect to the molded bodies in the shape of a plate under the conditions of $CO_2$ saturation, pore formation and hardening and heat treatment (pyrolysis) processes as below:

TABLE 1

| Example No. | Composition of raw materials (wt %) | | | | | Saturation of $CO_2$ (atm) | Pore formation (° C., sec) | Hardening (° C., hr, atmosphere) | Heat treatment (° C., hr, atmosphere) |
|---|---|---|---|---|---|---|---|---|---|
| | Polycarbosilane | Polysilazane | $Al_2O_3$ | $Y_2O_3$ | SiC | | | | |
| Comparative Example | | | | | | | | | |
| 1 | 40 | | 1 | 1 | 58 | — | — | — | 1,850, 1, Ar |
| 2 | 20 | | 4.3 | 5.7 | 70 | — | — | — | 1,900, 1, Ar |

TABLE 1-continued

| Example No. | Composition of raw materials (wt %) | | | | | Saturation of $CO_2$ (atm) | Pore formation (° C., sec) | Hardening (° C., hr, atmosphere) | Heat treatment (° C., hr, atmosphere) |
|---|---|---|---|---|---|---|---|---|---|
| | Poly-carbosilane | Poly-silazane | $Al_2O_3$ | $Y_2O_3$ | SiC | | | | |
| Example of Present Invention | | | | | | | | | |
| 3 | 98 | | 1 | 1 | — | 80 | 250, 2 | 200, 3, air | 1,700, 2, Ar |
| 4 | | 95 | 3 | 2 | — | 20 | 200, 1 | 300, 3, Ar | 1,800, 2, $N_2$ |
| 5 | 90 | | 4.3 | 5.7 | — | 200 | 260, 300 | 220, 1, air | 1,850, 1, Ar |
| 6 | 86 | | 12 | 2 | — | 400 | 180, 3 | 160, 24, air | 1,900, 1, Ar |
| 7 | 90 | | 6 | 14 | — | 400 | 200, 10 | 180, 12, air | 1,800, 6, Ar |
| 8 | 100 | | — | — | — | 75 | 200, 3 | 180, 4, air | 1,850, 1, Ar |

In Table 1, $CO_2$ saturation was carried out at 20° C., and the pore formation, hardening and heat treatment processes were all carried out under atmospheric pressure. During the heat treatment process, the rate at which the temperature rose was 2° C./min till 1,200° C., and over 1,200° C. at 5° C./min. Moreover, as a starting material in Example 8 of the present invention, pure polymer ceramic precursor powder (polycarbosilane) was used, and the aforementioned mixing process was omitted therein.

Meanwhile, Table 1 shows comparative examples of conventional methods of producing microporous ceramic materials by mixing pyrolytic or volatile materials to ceramics, and then forming pores therein by volatilizing the volatile component in the mixture according to U.S. Pat. No. 5,358,910. In Comparative Examples 1 and 2, as shown in Table 1, microporous ceramic materials were produced by using a starting material of a ceramic component of SiC, adding polycarbosilane and a ceramic powder component ($Al_2O_3$, $Y_2O_3$), mixing said starting material by ball-milling, and after formation, carrying out pyrolysis by heating the same. The conditions for ball-milling and formation were the same as those of the examples of the present invention in Table 1, and the conditions for heat treatments were the same or very similar to those of the examples of the present invention.

Table 2 shows the measurements of porosity, pore size, pore density (the number of pores per unit volume), which were measured from their electron microscope photographs, and strength of the products of comparative examples and examples of the present invention.

TABLE 2

| Examples | Porosity (%) | Pore size ($\mu$m) | Pore density (No./cm$^3$) | Strength (kg/cm$^2$) |
|---|---|---|---|---|
| Comparative Example | | | | |
| 1 | 45 | 1~70 | $2 \times 10^7$ | 512 |
| 2 | 21 | 2~55 | $2 \times 10^6$ | 817 |
| Examples of Present Invention | | | | |
| 3 | 90 | 40~55 | $2 \times 10^7$ | 1,025 |
| 4 | 62 | 260~300 | $2 \times 10^4$ | 1,150 |
| 5 | 21 | 10~25 | $3 \times 10^7$ | 2,122 |
| 6 | 6 | 6~15 | $3 \times 10^7$ | 3,802 |
| 7 | 46 | 2~9 | $1 \times 10^{12}$ | 1,615 |
| 8 | 55 | 5~20 | $2 \times 10^{10}$ | 1,215 |

As shown in Table 2, as compared to those of the comparative examples produced by means of conventional methods, microporous ceramic materials produced in the examples of the present invention had a narrower range of pore size with enhanced strength. This implies that the microporous ceramic materials of the present invention have relatively uniform pore size as compared to the conventional multiporous ceramic materials.

Moreover, in comparing Comparative Example 1 with Example 7 of the present invention, and Comparative Example 2 with Example 5 of the present invention, it shows that at equivalent or similar porosity, the strength of the materials in examples of the present invention is twice as strong or stronger than that of the comparative examples.

As shown in Tables 1 and 2, the microporous ceramic materials according to the present invention, as compared to conventional multiporous ceramic materials, have a uniform range of size and pores, and in particular at the same level of porosity, the strength thereof is much more superior.

Figure 2:
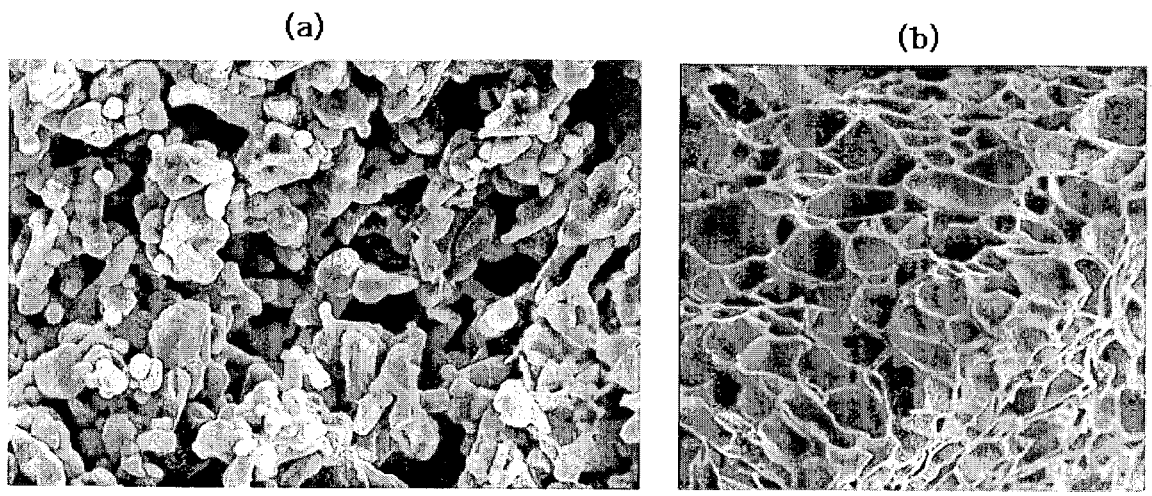
FIGS. 2(a) and (b) are electron microscope photographs of conventional multiporous ceramic materials and microporous ceramic materials of the present invention.
Figure 3:
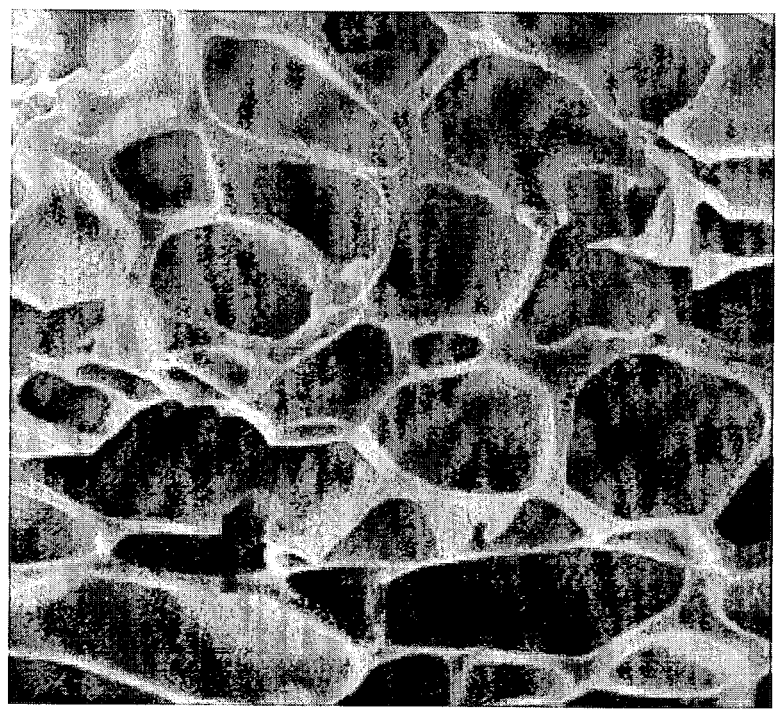
FIG. 3 is an enlarged electron microscope photograph of microporous ceramic materials of the present invention.

FIGS. 2(a) and (b) are scanning electron microscope (SEM) photographs at ×300, which represent typical fracture surfaces of the microporous ceramic material and the conventional multiporous ceramic material. FIG. 2(a) is a photograph of the ceramic material of Comparative Example 1 of Table 1, and FIG. 2(b) is a photograph of the ceramic material of Example 3 of the present invention in Table 1. FIG. 3 is a scanning electron microscope (SEM) photograph (at ×600) of the microporous ceramic material of Example 3 of the present invention.

In FIG. 2(a), the black portions in the background are pores. As shown in scanning electron microscope photographs of Comparative Example 1 and Example 3 of the present invention in Table 2, the pores in the ceramic materials of the present invention were much more uniformly distributed and had smaller variation in pore size. In FIG. 3, the uniformity of the ceramic materials of the present invention could be clearly seen.

Accordingly, as shown in Table 2, and FIGS. 1 and 3, as compared to the conventional multiporous ceramic materials, the microporous ceramic materials of the present invention had relatively uniform pore size, uniform distribution of pores, and superior strength.

Embodiment 2

The polysiloxane powder used herein had the following characteristics: a particle size distribution of 1~50 $\mu$m, an average particle diameter of approximately 15 $\mu$m, an average molecular weight of 6,500. The starting material was prepared by adding to said polysiloxane powder 3~20 wt % of sintering additives, which were selected from 2–14 wt % of $Al_2O_3$ and 1–12wt % of $Y_2O_3$, and then by additionally adding aluminumacetyl acetonate as a hardener in the amount corresponding to 1 wt % of the total weight of the polysiloxane powder. The mixture of said raw materials was placed into a polyethylene ball mill, followed by dry ball-milling it for 12 hours by using SiC balls.

Plate-shaped specimens with a dimension of 30×30×5 mm were uniaxially pressed at a pressure of approximately 300 kg/cm² by using a metal mold. Thereafter, it was placed into a cylindrical latex (rubber mold), sealing the inside of the latex so as to maintain vacuum of $1×10^{-1}$ mmHg. The molded bodies containing the polymer ceramic precursor were produced by undergoing hydrostatic molding by pressure of approximately 1,500 kg/cm².

Microporous ceramic materials were produced by carrying out saturation, pore formation, hardening and pyrolysis processes with respect to the molded bodies in the shape of a plate under the conditions of $CO_2$ saturation, pore formation and hardening and heat treatment (pyrolysis) processes in Table 3:

TABLE 3

| Example No. | Batch composition (wt %) | | | Saturation of $CO_2$ (atm) | Pore formation (° C., sec) | Hardening (° C., hr) | Heat treatment (° C., hr, atmosphere) |
| --- | --- | --- | --- | --- | --- | --- | --- |
| | Poly-siloxane | $Al_2O_3$ | $Y_2O_3$ | | | | |
| 9 | 97 | 2 | 1 | 80 | 90, 5 | 80, 8 | 1,600, 12, $N_2$ |
| 10 | 95 | 3 | 2 | 40 | 85, 300 | 50, 24 | 1,750, 2, Ar |
| 11 | 90 | 4.3 | 5.4 | 80 | 100, 1 | 80, 100 | 1,700, 8, Ar |
| 12 | 85 | 3 | 12 | 120 | 90, 10 | 110, 1 | 1,800, 1, Ar |
| 13 | 80 | 14 | 6 | 400 | 80, 2 | 80, 12 | 1,750, 2, Ar |

In Table 3, $CO_2$ saturation was carried out at 20° C., and the pore formation, hardening and heat treatment processes were all carried out at atmospheric pressure. In the heat treatment process, the rate at which the temperature rose was 1° C./min till 1,200° C., and over 1200° C. at 5° C./min.

With the measurements from their electron microscope photographs, Table 4 shows the results for their porosity, pore size, pore density (number of pores per unit volume), and strength of the products produced under the conditions of Table 3 according to the examples of the present invention.

TABLE 4

| Examples | Porosity (%) | Pore size (μm) | Pore density (No./cm³) | Strength (kg/cm²) |
| --- | --- | --- | --- | --- |
| 9 | 53 | 100~140 | $3 × 10^5$ | 1,192 |
| 10 | 21 | 15~30 | $2 × 10^7$ | 2,053 |
| 11 | 63 | 150~200 | $1 × 10^5$ | 1,270 |
| 12 | 51 | 120~150 | $2 × 10^5$ | 1,317 |
| 13 | 5 | 1~5 | $5 × 10^{10}$ | 3,165 |

As shown in Tables 2 and 4, as compared to those of Comparative Examples 1 and 2 of Table 1, which were produced by means of the conventional methods, the microporous ceramic materials of the examples of the present invention had a narrower range of pore size with enhanced strength. This implies that the microporous ceramic materials of the present invention have relatively uniform pore size as compared to the conventional multiporous ceramic materials.

Moreover, as in Comparative Example 2 and Example 10 of the present invention, at equivalent porosity, the strength of the materials in the examples of the present invention was twice as strong or stronger.

As shown in Tables 2 and 4, the microporous ceramic materials according to the present invention, as compared to the conventional multiporous ceramic materials, have a uniform range of pore size, and in particular at the same level of porosity, the strength thereof is much more superior.

As shown in Examples 1 and 2, as compared to the conventional multiporous ceramic materials, the microporous ceramic materials of the present invention have superior pore characteristics and strength. By uniformly evolving $CO_2$ super-saturated over the entire material, the present invention results in formation of homogeneous distribution of pores of uniform size over the entire material. Based on this result, the present invention, as compared to the conventional multiporous ceramic materials at equivalent porosity, is able to significantly reduce the size of its critical defects, which lead to fracture of the material.

INDUSTRIAL APPLICABILITY

As described above, the method of producing microporous ceramic materials according to the present invention enables production of microporous ceramic materials of superior strength, which have pores of uniform size and homogeneous distribution of pores over the entire materials by means of using fluid of a non-critical state as a medium for forming pores.

Moreover, the present invention enables easy control of pore characteristics (e.g., pore size) suitable to the target materials by adjusting pressure in a non-critical state. Since supercritical fluid is not necessary, the present invention does not require additional processes or devices, which is economically advantageous.

Further, as compared to the conventional multiporous ceramic materials, the microporous ceramic materials according to the present invention have enhanced strength due to their smaller size of critical defects. Accordingly, the microporous ceramic materials according to the present invention can be suitably utilized in areas such as for various structural materials, high-temperature filters, and electrode materials.

What is claimed is:

1. A method of producing microporous ceramic materials, which comprises the steps of: producing molded bodies by homogeneously mixing a starting material of polymer ceramic precursor powder and ceramic powder, and then molding the same; saturating the molded bodies in a pressure vessel by introducing $CO_2$ of 20–400 atm. at a temperature below its critical temperature; super-saturating the $CO_2$ saturated to said molded bodies by adjusting pressure in said pressure vessel; forming micropores in said molded bodies by evolving said $CO_2$ of super-saturated state from said molded bodies by heating the same at a temperature between the softening temperature and the melting temperature of said polymer ceramic precursor; hardening said molded bodies having micropores; and carrying out pyrolysis by heating said hardened molded bodies.

2. The method of producing microporous ceramic materials according to claim 1, wherein said polymer ceramic precursor powder is at least one material, which is selected from the group consisting of polycarbosilane, polysiloxane, and polysilazane.

3. The method of producing microporous ceramic materials according to claim 1, which comprises forming said mixture of starting materials by uniaxial pressing or hydrostatic molding.

4. The method of producing microporous ceramic materials according to claim 1, wherein said step of carrying out pyrolysis comprises heating the same at about 1,600 to 1,900° C. in inert gas or air.

5. The method of producing microporous ceramic materials according to claim 1, wherein said polymer ceramic precursor powder makes up at least 50 wt % of the total weight of the starting material.

6. The method of producing microporous ceramic materials according to claim 1, wherein said ceramic powder is at least one of SiC or $Si_3N_4$.

7. The method of producing microporous ceramic materials according to claim 1, wherein said polymer ceramic precursor powder makes up at least 80 wt % of the total weight of the staring material.

8. The method of producing microporous ceramic materials according to claim 1, wherein said ceramic powder is at least one material selected from the group consisting of $A_2O_3$, $Y_2O_3$, SiC, and $SiN_4$.

9. The method of producing microporous ceramic materials according to claim 1, which comprises mixing and forming the starting material by adding to said starting material a hardener at 5 wt % or less of the total weight of the polymer ceramic precursor powder.

10. The method of producing microporous ceramic materials according to claim 9, wherein said hardener is at least one material, which is selected from aluminum acetyl acetonate or triethylenediamine.

11. A method of producing microporous ceramic materials, which comprises the steps of: producing molded bodies by forming polymer ceramic precursor powder; saturating the molded bodies in a pressure vessel by introducing $CO_2$ of 20–400 atm. at a temperature below its critical temperature; super-saturating the $CO_2$ saturated to said molded bodies by adjusting pressure in said pressure vessel; forming micropores in said molded bodies by evolving said $CO_2$ of super-saturated state from said molded bodies by heating the same at a temperature between the softening temperature and the melting temperature of said polymer ceramic precursor; hardening said molded bodies having micropores; and carrying out pyrolysis by heating said hardened molded bodies.

12. The method of producing microporous ceramic materials according to claim 11, which comprises mixing a hardener at 5 wt % or less of the total weight of said polymer ceramic precursor powder, and then forming the same.

* * * * *